United States Patent
Modeen et al.

[11] Patent Number: 6,131,449
[45] Date of Patent: Oct. 17, 2000

[54] VELOCITY ADAPTIVE CONTROL TEST SYSTEM

[75] Inventors: Douglas P. Modeen, Granby; Bhupindar Singh, West Hartford, both of Conn.

[73] Assignee: United Technologies Corporation, Windsor Locks, Conn.

[21] Appl. No.: 09/283,048

[22] Filed: Apr. 1, 1999

Related U.S. Application Data

[63] Continuation-in-part of application No. 08/955,006, Oct. 20, 1997.

[51] Int. Cl.[7] .................................................. G01M 15/00
[52] U.S. Cl. ............................................................ 73/118.1
[58] Field of Search ................................. 73/1.79, 865.9, 73/118.1, 117.3

[56] References Cited

U.S. PATENT DOCUMENTS

| | | | |
|---|---|---|---|
| 4,158,884 | 6/1979 | McKinley et al. | 73/117.3 |
| 5,423,203 | 6/1995 | Namiki et al. | 73/118.1 |

*Primary Examiner*—Robert Raevis

[57] ABSTRACT

A velocity adaptive method for testing the control of dynamic devices of a system having a position schedule influenced by a dynamic factor is disclosed. The method includes the steps of introducing a step into the position schedule and causing a disturbance in the system; maintaining the step for an interval of time; removing the step; calculating step response by the system while accounting for the dynamic factor; and comparing the step response to a threshold value for determining one of the failure and successful operation of the control.

9 Claims, 3 Drawing Sheets

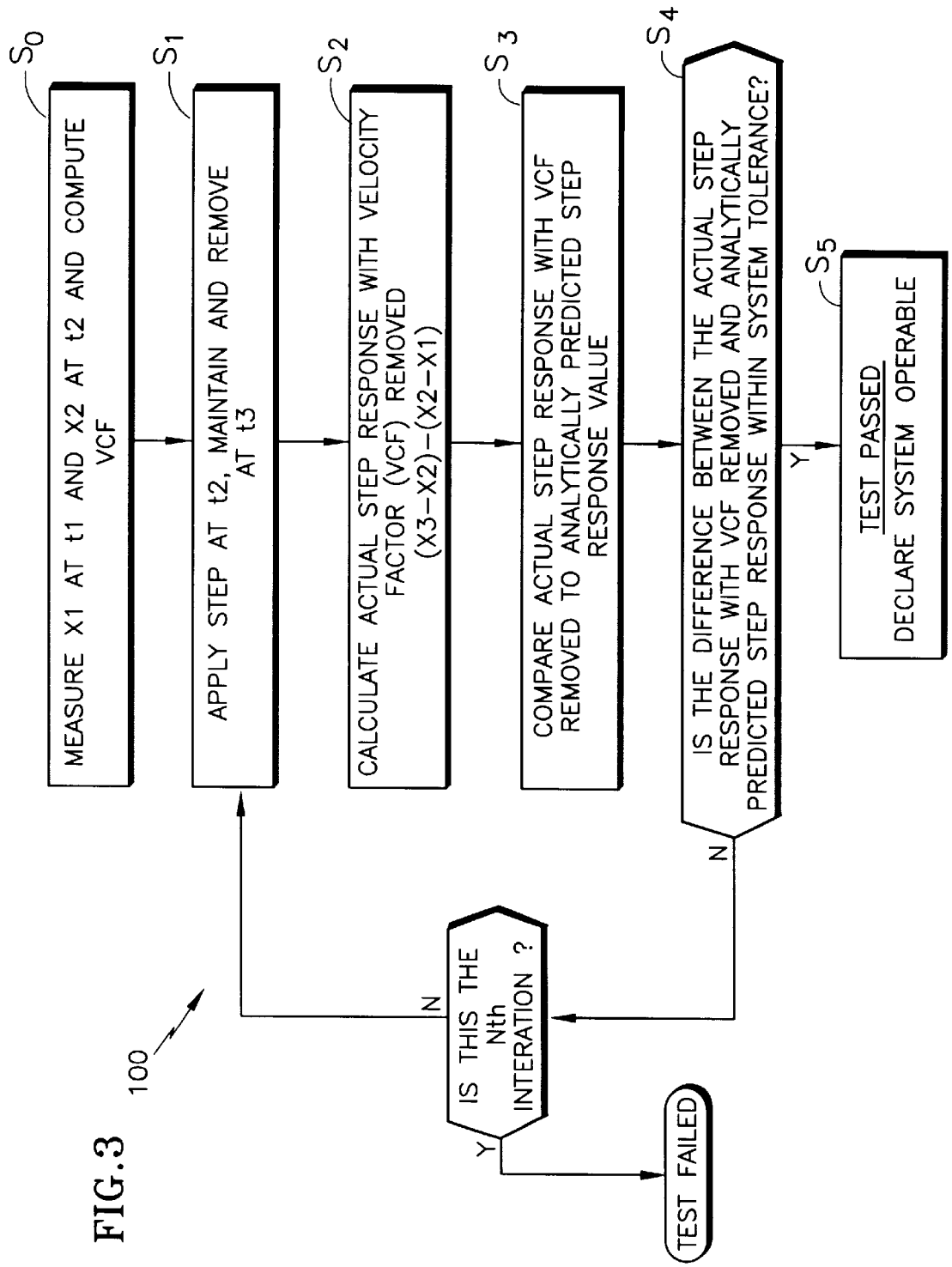

VELOCITY ADAPTIVE CONTROL TEST SYSTEM

This application is a Continuation-in-Part of U.S. application Ser. No. 08/955,006 filed Oct. 20, 1997.

TECHNICAL FIELD

This invention is directed to a control system for testing the performance of aircraft engine/surface actuator controls, and more particularly, to a control system for testing the performance of a control associated with the inlet guide vanes of an aircraft engine.

BACKGROUND ART

Preflight tests are conducted on aircraft engine subsystems prior to takeoff to check their performance levels. An example of such a subsystem includes the inlet guide vanes subsystem including the associated controller and actuator therefor. Conventionally, the tests performed preflight exercise of the subsystem under predetermined conditions with a battery of tests so as to ensure the subsystem's proper functionality for flight conditions. In such tests, the subsystem performance is even monitored by various diagnostics or by a human observer on the ground. Tests are typically conducted in sequence, which results in an increased pilot workload and increased aircraft ground time. For obvious reasons, both of these results translate into higher operational costs of the aircraft and specifically the aircraft engine.

More specifically, for some modern aircraft, the inlet guide vane control system (IGVCS) has a dual lane architecture comprised of an electronic primary lane an a hydromechanical secondary lane. The IGVCS controls the inlet guide vane position as a function of engine speed while taking into account air inlet temperature.

The primary electronic and secondary hydro-mechanical lanes have similar characteristics and each lane's characteristics must be verified individually before takeoff to ensure a fully operational system for a successful flight. The backup hydro-mechanical system control functionality is tested on powerup by a primary lane processor by conducting a preflight test which ensures the hydro-mechanical lane's full operational capability. However, with the current technology, both lanes must be checked with significant input by the pilot, typically requiring these tests be performed sequentially relative other testing procedures as opposed to simultaneously.

There exists a need, therefore, for an actuator control test system, which test system is independent of operator intervention and which can be conducted during any operating mode of the system.

DISCLOSURE OF INVENTION

The primary object of this invention is to provide an improved system for testing engine subsystems.

Another object of this invention is to provide an improved system for testing aircraft engine subsystems, which system performs independent of operator input and during any mode of engine operation.

Another object of this invention is to provide a system for testing the performance of an inlet guide vane subsystem of an aircraft engine, which test system accounts for dynamic changes in the guide vane subsystem for a more accurate test result.

Still another object of this invention is to provide an inlet guide vane subsystem controller test system for testing the inlet guide vane subsystem of an aircraft engine, which test system accounts for subsystem velocity in determining subsystem performance.

And still another object of this invention is to provide an engine subsystem test method for testing engine subsystems such as inlet guide vane subsystems, which test system tests the controller of the subsystem while involving no pilot intervention, taking into account the dynamics of the subsystem, and completing testing regardless of the operational mode of the subsystem.

The foregoing objects and following advantages are achieved by the velocity adaptive method of the present invention for testing the control of dynamic devices of a system having a position schedule influenced by a dynamic factor.

The method includes the steps of introducing a step into the vane actuator position schedule and causing a disturbance in the system; maintaining the step for an interval of time; removing the step; calculating step response by the system while accounting for the dynamic factor; and comparing the step response to a threshold value for determining one of the failure and successful operation of the control.

In a preferred embodiment, the system is an inlet guide vane subsystem including an actuator and control for which the method of the present invention is used to test performance.

BRIEF DESCRIPTION OF THE DRAWINGS

FIG. 3 is a simplified flowchart of the method of the present invention.

BEST MODE FOR CARRYING OUT THE INVENTION

Figure 1:
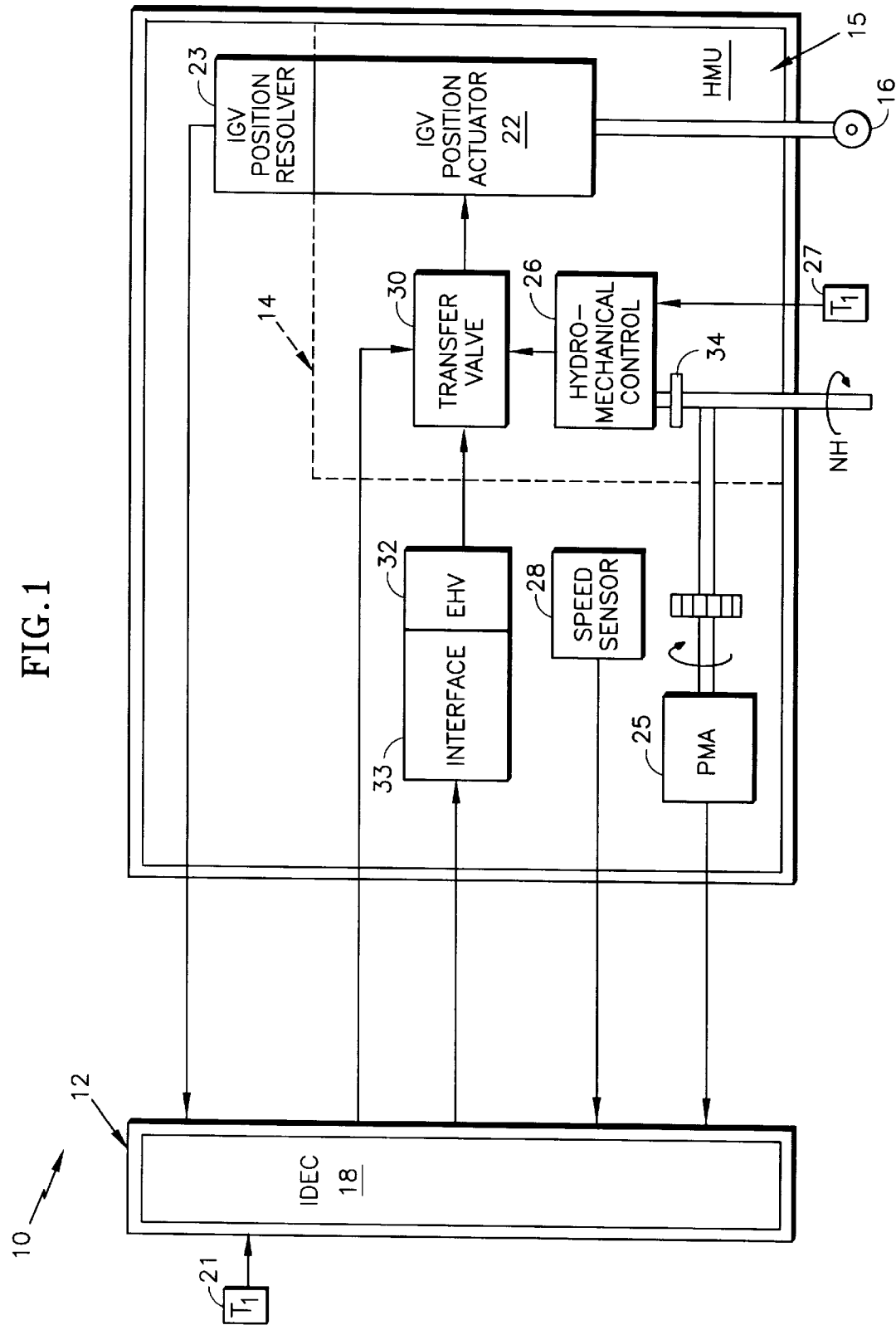
FIG. 1 is a schematic diagram of one system with which the method of the present invention is used.

Referring now to the drawings in detail, there is shown in FIG. 1 a schematic diagram of one system with which the method of the present invention is used, designated generally as 10. System 10 includes a primary electronic lane 12 and a secondary hydro-mechanical lane 14, substantially as enclosed by the dotted lines, which are used for controlling the position of inlet guide vanes (IGV) of an engine. The IGV are a part of a hydromechanical unit (HMU) 15 and are shown schematically as 16. Position of the guide vanes is controlled as a function of engine speed NH and in accordance with engine air inlet temperature $T_1$. Primary electronic lane 12 consists of an inlet guide vane digital electronic control (IDEC) 18 and shares portions of the HMU 15 with the secondary lane 14. The method of the present invention functions to test the performance of IDEC 18.

Primary lane 12 includes IDEC 18, and an electrohydraulic valve (EHV) 32 to command inlet guide valve vane position via guide vane position actuator 22, and an engine speed sensor 28 for use by the IDEC for determining appropriate inlet guide vane position. An interface 33 is also provided for use in communications between IDEC 18 and EHV 32. Temperature sensor 21 provides air inlet temperature data to the IDEC 18 of primary lane 12 for further use with sensed speed NH for positioning IGV 16. The transfer valve 30 is responsive to a command from the primary electronic lane for selecting whether the primary electronic lane 12 or the secondary hydromechanical lane 14 controls IGV 16 position. In addition, a dual output IGV position resolver 23 is provided for giving feedback to IGV actuator 22 for checking inlet guide vane position. Finally, a permanent magnetic alternator (PMA) located in HMU 15, for providing power to the primary lane 12. IGV actuator 22 is shared between the secondary lane 14 and the primary lane 12 and is located in HMU 15.

Secondary hydro-mechanical lane 14 comprises a hydro-mechanical control 26 which in combination with IGV actuator 22 provides hydraulic force actuation for positioning the inlet guide vanes during the secondary control lane operation, in the backup mode. Secondary control lane 14 senses engine air inlet temperature $T_1$ via a liquid bulb temperature device 27 and engine speed via a flyweight actuator 34. It continually schedules inlet guide vane positioning during operation and control by the primary electronic lane. This activity maintains readiness to take control of system 10 in the event of primary lane failure. However, until the transfer valve 25 is commanded by the primary lane 12 to transfer control, the secondary lane 14 is isolated from IGV 16.

IDEC 18 of the primary electronic lane has two operational channels and starts up automatically upon the application of power by the operation of the aircraft. The IDEC takes control of system 10 by powering up either of the channels and reads temperature $T_1$ from a temperature sensor 21 and engine speed NH from its speed sensor 28 and thereby computes the desired position of the inlet guide vanes. The dual channel architecture operates in an active/standby mode such that one channel is active and the other is in standby. If a failure occurs in one of the channels, an automatic transfer to the standby channel is made. In the case where both channels fail, or if a fault is detected which cannot be isolated to either channel, control is automatically transferred to the hydro-mechanical secondary lane 14.

Accordingly, the primary lane 12 and secondary lane 14 have similar characteristics and each lane's characteristics must be verified individually before takeoff to ensure a fully operational system for successful flight. In addition to the testing of the primary lane 12, as will be described below, and which is the subject invention, the hydro-mechanical secondary lane 14 is also tested by the IDEC for ensuring full operational capability thereof.

Preferably, before the method of the present invention is implemented, a preflight test on HMU 15 is performed by IDEC 18. The system is then transferred to the primary electronic lane 12 via a transfer control valve 30. This transfer, in and of itself, is checked to make sure that the transfer control valve 30 is properly working. The method 100 in accordance with the principles of the present invention, as described in FIG. 3, is then implemented.

As the pilot in the aircraft moves the power lever past idle, the engine speed increases and the primary lane 12 starts opening the inlet guide vanes of the engine (not shown) via a preset position schedule. When the vanes have moved to approximately 5° away from their low speed stop position, the method 100 begins.

Figure 2:
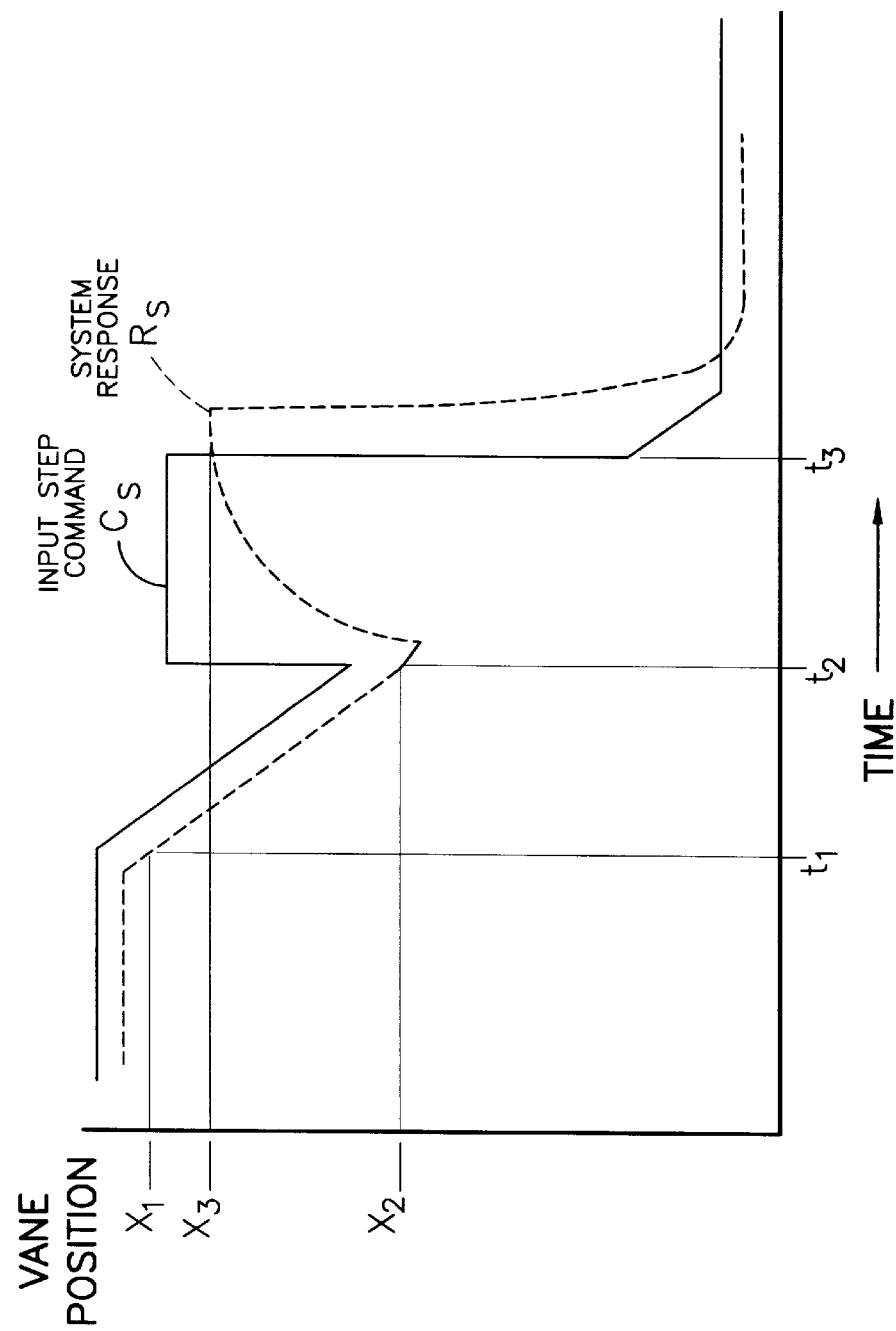
FIG. 2 is a graphical representation of the step application of the method of the present invention.

Referring to FIGS. 1–3, in step $S_0$ of method 100, the position of the IGV is measured at t1 and t2 and VCF is calculated. Step $S_1$ includes a command $C_s$ by primary lane 12 of a small step at t2 in system 10, maintenance of the step for a short period of time and then removal of the step. Step $S_1$ is performed when the engine is running and the inlet guides are moving. The step causes a slight change in the positioning of the inlet guide vanes, thereby moving system 10 off the position schedule. Preferably, the disturbance of the position of the inlet guide vanes is small enough not to impact engine functionality but large enough to cause a determinate change in the position of the inlet guide vanes. A graphical representation of the application of this step in accordance with method 100 is shown in FIG. 2, which is a plot of inlet guide vane position versus engine speed and step response. The solid lines indicate the step command $C_s$ which does not take into account the dynamic speed factor of the system. The dotted lines represent a plot of the total system response $R_s$ by system 10, which response is affected by the velocity of the inlet guide vanes. That is, the movement of the vanes away from the scheduled velocity position is due to disturbance caused by the step input by method 100 as well as the dynamics in the system in existence before the application of the step, specifically the velocity factor. When the velocity factor is removed from the total system response, the result is a step response which can be compared with an analytically predicted step response with no velocity.

In step $S_2$ of method 100, therefore, the step response of the system in consideration of a velocity compensation factor (VCF) is calculated. The actual Step response with velocity factor removed is given by the equation:

Actual Step Response=Total System Response−*VCF*, (eq. 1)

Where the Total System Response is the system response due to initial velocity and the application of the step, and the VCF is the Velocity Compensation Factor.

The above Actual Step response is based on the classical Servo design theory of a first order closed loop system. If the system is moving dynamically at a velocity U and a step is applied to the system, its response to the step input is given by Analytically Predicted Step response with zero velocity=System response−$U^*(K^*T)$ (eq. 1A)

Where

Analytically Predicted Step Response with zero velocity=(step input)*$[1-e^{**}(-t/T)]$ $U^*(K^*T)$ represents VCF (velocity compensation factor) in which T is the time constant of the system U is the velocity of the system before a step is applied K is the factor given by eq:

$K=[1-e^{**}(-t/T)]$ (eq. 1B)

t is the time for which system response is monitored

In the IGV system, the term K is deterministic and the term U, the velocity of the system, is unknown. This velocity is dependent on pilot command, which varies the actuator velocity from one time to another.

However the term $U^*(K^*T)$ represents the position traveled by the vane in time $(K^*T)$ and this can be measured by monitoring the vane movement for time $(K^*T)$ before a step is applied. Similarly the system response can be monitored for the time t and its value of K can be computed analytically for time t.

In a digital system, the monitoring time is dependent on the sample time at which response sensor is sampled. In this application, the vane position was monitored during a time interval of (t2−t1) before the step. Then a step was applied at t2 and the system response was monitored during a time interval of (t3−t2) following the step. (See FIG. 2 ). Time t1 is selected so that it is prior to the step input. It is the beginning of the time at which the position is measured by the computer. The time t3 is selected so that measurable step response can be predicted for interval (t3−t2).

The time interval (t2−t1) can be computed as follows:

$$(t2-t1)=T^*[1-e^{**}(-(t3-t2)/T)], \text{ and}$$

$$t1=t2-T^*[1-e^{**}(-(t3-t2)/T)]$$

where T is the time constant of the system.

With reference to FIG. 2, the position of inlet guide vanes at time $t_1$, before the step input by method 100, is given by $X_1$ and at time $t_2$ at the time of the step input, is given by $X_2$. At time $t_3$, following the application of the step, the IGV position equals $X_3$. Accordingly, System Response=$(X_3-X_2)$; (eq. 2)

Velocity Compensation Factor=$(X_2-X_1)$; and (eq. 3)

Actual Step Response=$(X_3-X_2)-(X_2-X_1)$ (eq. 4)

In step $S_2$, Actual Step Response is calculated, therefore, with eq. 4.

In step $S_3$, the actual step response of step $S_2$ is compared to the analytically predicted step response, which is indicative of a minimum distance the guide vanes would move given the step applied. In the preferred embodiment the predicted step response value is equal to 1°, however other values can be used as desired. That is, this value may differ depending upon the magnitude of the step applied and/or the element type being moved.

In step $S_4$, if the difference between the actual step response of step $S_2$ and the analytically predicted step response is not within the system tolerance, the method is sent back to step $S_1$ for retest since such a comparison indicates a failed test. If the test fails N more times, depending upon the allowed false alarm rate, the system is declared to have failed.

In step $S_5$, if the comparison indicates that difference between the actual step response and the analytically predicted step response is with in the acceptable system tolerance, then the test is ended and the system is declared operable since at least the desired amount of movement was made.

In accordance with the above methodology, the algorithm described is self-correcting for faster or slower systems and for accelerating or decelerating systems, since the sign and magnitude of VCF changes in computation depending upon whether the system is accelerating or decelerating. That is, VCF is positive for an accelerating system and negative for a decelerating system and 0 for a fixed steady state input condition. For faster systems, VCF magnitude is higher and for slower systems, the magnitude of VCF is lower.

While the method 100 of the present invention has been described for use with a control and actuator for inlet guide vanes, the same method can be applied to any control of an actuator and actuated elements which are dynamically changing position following a preprogrammed schedule in normal operation.

In operation, therefore, with the aircraft occupied by a pilot operator, the operator automatically activates method 100 by moving the power level past idle. At this point, the engine speed increases, causing the IDEC of the primary lane to start opening the inlet guide vanes via the inlet guide vane actuator 22. When the vanes have been moved about 5° away from the low speed stop position, the primary lane 12 commands a small step into the system 10, maintains the step for a small time and then removes the step. The analytical calculations and stored threshold value as set forth in the above methodology are then compared. If the comparison indicates a step response value less than the threshold value, the tests are repeated a maximum of three times and upon the accumulation of three failed comparisons, the system is deemed in failure and the appropriate precautions must be taken. If the step response is greater than the threshold value, the test is deemed passed and the system approved for operation.

The primary advantage of this invention is that an improved system is provided for testing engine subsystems.

Another advantage of this invention is that an improved system is provided for testing aircraft engine subsystems, which system performs independent of operator input and during any mode of engine operation. Another advantage of this invention is that a system for testing the performance of an inlet guide vane subsystem of an aircraft engine is provided, which test system accounts for dynamic changes in the guide vane subsystem for a more accurate test result. Still another advantage of this invention is that an inlet guide vane subsystem controller test system is provided for testing the inlet guide vane subsystem of an aircraft engine, which test system accounts for subsystem velocity in determining subsystem performance. And still another advantage of this invention is that an engine subsystem test method is provided for testing engine subsystems such as inlet guide vane subsystems, which test system tests the controller of the subsystem while involving no pilot intervention, taking into account the dynamics of the subsystem, and completing testing regardless of the operational mode of the subsystem.

Although the invention has been shown and described with respect to a best mode embodiment thereof, it should be understood by those skilled in the art that the foregoing and various other changes, omissions, and additions in the form and detail thereof may be made without departing from the spirit and scope of the invention.

What is claimed is:

1. A velocity adaptive method for testing the control of dynamic devices of a system having a position schedule influenced by a dynamic factor, comprising the steps of:

introducing a step into the position schedule and causing a disturbance in the system;

maintaining said step for an interval of time;

removing said step;

calculating step response by the system while accounting for the dynamic factor; and comparing said step response to a threshold value for determining one of the failure and successful operation of the control.

2. The method according to claim 1, wherein the dynamic factor is velocity of the devices, said step of calculating including determining a system response value indicative of a response of the system to said step as commanded by the control, determining a dynamic value for said velocity, and subtracting said dynamic value from said system response value.

3. The method according to claim 1, wherein the system is an aircraft engine having inlet guide vanes and an associated actuator, said step of introducing including causing a change in position of the inlet guide vanes for moving the engine off the position schedule.

4. The method according to claim 3, wherein the dynamic factor is velocity of the inlet guide vanes, said step of calculating including determining a response value indicative of a response of the control to said step, determining a dynamic value for said velocity, and subtracting said dynamic value from said response value.

5. The method according to claim 1, further comprising the steps of:
repeating said steps of introducing, maintaining, removing, calculating, and comparing if the control is determined to have failed; and
declaring a control failure if the control fails a given number of times.

6. The method according to claim 5, wherein in said step of declaring said given number of times is three.

7. The method according to claim 1, wherein in said step of comparing if said step response is less than said threshold value said control is in failure and wherein if said step response is greater than said threshold value said control is successfully operating.

8. The method according to claim 1, where in the system is an aircraft engine having inlet guide vanes and an associated actuator, said step of introducing including causing a change in position of the inlet guide vanes for moving the engine off the position schedule, wherein said step has a magnitude for moving said inlet guide vanes at least 1° and said threshold value is equal to 1°.

9. The method according to claim 8, wherein if said step response is less than 1° as determined in said step of calculating, said control is in failure.

* * * * *